US008143186B2

(12) United States Patent
Rytter

(10) Patent No.: US 8,143,186 B2
(45) Date of Patent: Mar. 27, 2012

(54) PROMOTED FISCHER-TROPSCH CATALYSTS

(75) Inventor: Erling Rytter, Trondheim (NO)

(73) Assignees: Statoil ASA, Stavanger (NO); Petro SA, Capetown (ZA)

( * ) Notice: Subject to any disclaimer, the term of this patent is extended or adjusted under 35 U.S.C. 154(b) by 832 days.

(21) Appl. No.: 11/663,663

(22) PCT Filed: Sep. 23, 2005

(86) PCT No.: PCT/GB2005/003675
§ 371 (c)(1),
(2), (4) Date: Feb. 14, 2008

(87) PCT Pub. No.: WO2006/032907
PCT Pub. Date: Mar. 30, 2006

(65) Prior Publication Data
US 2008/0255256 A1 Oct. 16, 2008

(30) Foreign Application Priority Data

Sep. 23, 2004 (GB) .................................. 0421242.9
Dec. 3, 2004 (GB) .................................. 0426608.6

(51) Int. Cl.
B01J 23/00 (2006.01)
B01J 21/00 (2006.01)
B01J 29/00 (2006.01)
B01J 37/00 (2006.01)
B01J 20/00 (2006.01)

(52) U.S. Cl. ........ 502/260; 502/259; 502/263; 502/326; 502/327; 502/328; 502/332; 502/335; 502/337; 502/341; 502/349; 502/350; 502/351; 502/355; 502/407; 502/415; 502/439; 502/524

(58) Field of Classification Search ................... 502/259, 502/260, 263, 326, 327, 328, 332, 335, 337, 502/349, 350, 351, 355, 407, 415, 439, 241, 502/524
See application file for complete search history.

(56) References Cited

U.S. PATENT DOCUMENTS

| 1,746,464 | A |   | 2/1930  | Fischer et al. |         |
|-----------|---|---|---------|----------------|---------|
| 2,102,851 | A | * | 12/1937 | La Brie ........... | 188/331 |
| 2,666,756 | A | * | 1/1954  | Boyd et al. ...... | 526/108 |
| 3,235,515 | A | * | 2/1966  | Taylor ............ | 502/337 |
| 3,270,059 | A | * | 8/1966  | Winderl et al. ... | 564/469 |

(Continued)

FOREIGN PATENT DOCUMENTS

EP 0 296 726 6/1988

(Continued)

OTHER PUBLICATIONS

Li Fan et al., "Supercritical-phase process for selective synthesis of wax from syngas: Catalyst and process development," Catalysis Today, 36:295-306 (1997).

(Continued)

*Primary Examiner* — Cam N. Nguyen
(74) *Attorney, Agent, or Firm* — Patterson Thuente Christensen Pedersen, P.A.

(57) ABSTRACT

A catalyst composition comprising cobalt as an active catalytic element and a lesser amount of nickel as a promoter supported on a metal oxide support. The support may comprise alumina, silica, silica-alumina, zeolite, zirconia, magnesia or titania. The amount of nickel is preferably less than 50 wt %, relative to the amount of cobalt.

12 Claims, 2 Drawing Sheets

U.S. PATENT DOCUMENTS

| | | | | |
|---|---|---|---|---|
| 3,344,196 | A * | 9/1967 | Corr et al. | 568/864 |
| 3,403,111 | A * | 9/1968 | Colgan et al. | 502/314 |
| 3,407,149 | A * | 10/1968 | Taylor et al. | 502/335 |
| 3,423,194 | A * | 1/1969 | Kearby | 48/197 R |
| 3,441,251 | A * | 4/1969 | Burns | 254/131 |
| 3,591,649 | A * | 7/1971 | Kroll et al. | 585/267 |
| 3,751,508 | A * | 8/1973 | Fujiso et al. | 585/262 |
| 3,825,504 | A * | 7/1974 | Hiffman | 502/335 |
| 3,853,790 | A * | 12/1974 | Vosolsobe et al. | 502/324 |
| 3,876,557 | A | 4/1975 | Bland | |
| 3,883,444 | A | 5/1975 | Maselli et al. | |
| 3,933,883 | A | 1/1976 | Parthasarathy | |
| 4,065,484 | A * | 12/1977 | Dobashi | 518/709 |
| 4,088,608 | A * | 5/1978 | Tanaka et al. | 502/328 |
| 4,191,664 | A * | 3/1980 | McArthur | 502/335 |
| 4,247,730 | A * | 1/1981 | Brunelle | 585/489 |
| 4,285,837 | A * | 8/1981 | Sato et al. | 502/335 |
| 4,368,142 | A | 1/1983 | Frohning et al. | |
| 4,454,207 | A * | 6/1984 | Fraioli et al. | 429/17 |
| 4,456,703 | A * | 6/1984 | Aldridge | 502/335 |
| 4,539,310 | A * | 9/1985 | Leftin et al. | 502/303 |
| 4,729,981 | A * | 3/1988 | Kobylinski et al. | 502/259 |
| 4,801,573 | A * | 1/1989 | Eri et al. | 502/302 |
| 4,968,660 | A * | 11/1990 | Tijburg et al. | 502/303 |
| 4,977,126 | A * | 12/1990 | Mauldin et al. | 502/242 |
| 4,985,387 | A * | 1/1991 | Prigent et al. | 502/304 |
| 4,988,661 | A * | 1/1991 | Arai et al. | 502/327 |
| 5,268,091 | A * | 12/1993 | Boitiaux et al. | 208/251 R |
| 5,552,363 | A * | 9/1996 | Pannell et al. | 502/337 |
| 5,565,092 | A * | 10/1996 | Pannell et al. | 208/262.1 |
| 5,744,419 | A * | 4/1998 | Choudhary et al. | 502/326 |
| 6,019,954 | A * | 2/2000 | Tang et al. | 423/437.2 |
| 6,069,111 | A * | 5/2000 | Yamamoto et al. | 502/333 |
| 6,365,544 | B2 * | 4/2002 | Herron et al. | 502/326 |
| 6,486,220 | B1 * | 11/2002 | Wright | 518/709 |
| 6,486,221 | B2 * | 11/2002 | Lapidus et al. | 518/715 |
| 6,927,190 | B2 * | 8/2005 | Lok et al. | 502/327 |
| 7,163,963 | B2 * | 1/2007 | Fraenkel | 518/715 |
| 7,253,136 | B2 * | 8/2007 | Mauldin et al. | 502/327 |
| 7,256,154 | B2 * | 8/2007 | Moon et al. | 502/300 |
| 7,361,626 | B2 * | 4/2008 | Baijense et al. | 502/329 |
| 7,365,040 | B2 * | 4/2008 | Van Berge et al. | 502/260 |
| 7,422,995 | B2 * | 9/2008 | Baijense et al. | 502/329 |
| 7,452,844 | B2 * | 11/2008 | Hu et al. | 502/327 |
| 7,541,310 | B2 * | 6/2009 | Espinoza et al. | 502/326 |
| 2001/0051588 | A1 | 12/2001 | Herron et al. | |
| 2002/0028853 | A1 * | 3/2002 | Manzer et al. | 518/713 |
| 2003/0119668 | A1 * | 6/2003 | Lok et al. | 502/332 |
| 2004/0054016 | A1 | 3/2004 | Lu et al. | |
| 2004/0138060 | A1 * | 7/2004 | Rapier et al. | 502/302 |
| 2004/0204506 | A1 * | 10/2004 | Mauldin et al. | 518/717 |
| 2005/0245621 | A1 * | 11/2005 | Baijense et al. | 518/716 |
| 2005/0272827 | A1 * | 12/2005 | Lok | 518/716 |
| 2006/0009352 | A1 * | 1/2006 | Zhao et al. | 502/302 |
| 2006/0223693 | A1 * | 10/2006 | Fujimoto et al. | 502/60 |
| 2007/0099797 | A1 * | 5/2007 | Hu et al. | 502/319 |

FOREIGN PATENT DOCUMENTS

| | | |
|---|---|---|
| JP | 2003024786 | 1/2003 |
| WO | WO 96/00613 | 1/1996 |
| WO | WO 99/42214 | 8/1999 |
| WO | WO 2002/002229 | 7/2001 |
| WO | WO 02/47816 A1 | 6/2002 |
| WO | WO 2005/072866 | 8/2005 |

OTHER PUBLICATIONS

Schulz, "Major and minor reactions in Fischer-Tropsch synthesis on cobalt catalysts," Topics in Catalysis, 26(1-4):73-85 (2003).

* cited by examiner

PROMOTED FISCHER-TROPSCH CATALYSTS

RELATED APPLICATIONS

This application claims priority to PCT Application No. PCT/GB2005/003675 filed Sep. 23, 2005, Great Britain Application No. 0421242.9 filed Sep. 23, 2004, and now abandoned, and Great Britain Application No. 0426608.6 filed Dec. 3, 2004, and now abandoned, the disclosures of which are hereby incorporated by reference in their entireties.

FIELD OF THE INVENTION

The invention relates to Fischer-Tropsch catalysis. More particularly, it relates to catalysts comprising cobalt and iron, methods of faming such catalysts and methods of using such catalysts in a Fischer-Tropsch reaction.

BACKGROUND OF THE INVENTION

In the Fischer-Tropsch conversion of synthesis gas to hydrocarbons, cobalt is the preferred active metal when the feed to the syngas unit is natural gas. This choice is essentially based on the low shift activity of Co, that otherwise would convert some of the CO in the syngas to $CO_2$ and hydrogen, thereby losing some of the carbon in the feed.

Other known FT active metals are iron, ruthenium and nickel. Iron is frequently used particularly when the syngas is based on coal, as the inherent shift activity is needed to adjust the $CO/H_2$ ratio to the desired ratio around 2. Ruthenium is prohibited due to excessive cost, whereas nickel is rejected due to high selectivity to methane, thus giving rise to back-formation of the gas feed. It is well known that nickel catalysts are used for methanation, removing traces of residual CO in the feed for ammonia synthesis.

Normally the active FT-metal is dispersed on a solid support. The support can be alumina, titania or silica, as well as a variety of other oxides and mixed oxides, and the support can be chemically stabilized or treated in a number of ways. Of particular relevance is high temperature treatment of alumina giving a catalyst with high content of alpha-alumina, thereby increasing the selectivity to higher hydrocarbons (C5+), as disclosed in WO 02/47816 A1 (Statoil).

Preparation of the Catalyst can Involve Impregnation on the Support by a Selected technique, or co-precipitation with other ingredients in addition to the cobalt precursor. Subsequent forming to the desired shape can also be part of the procedure. Further, the catalyst preparation normally contains steps like drying, calcination and reduction to give the active catalyst. During preparation, a number of other elements or compounds often are added. These can be denoted as modifying agents, structural stability promoters, or promoters intended to increase selectivity, activity, stability or regeneration performance of the catalysts. Some modifiers or promoters frequently investigated are thoria, zirconia, manganese, alkali metals, lanthanum oxide or a mixture of lanthanides, rhenium, ruthenium and platinum.

A number of alternative impregnation procedures are known in the art which use alternative solvents and chemicals, however, in the present invention, the examples involve aqueous incipient wetness with solutions of cobalt nitrate $(Co(NO_3)_2 \cdot 6H_2O)$ and possibly perrhenic acid $(HReO_4)$ or ammonium perrhenate. Alternatives include using cobalt acetate(s), cobalt halide(s), cobalt carbonyl(s), cobalt oxalate(s), cobalt phosphate(s), organic cobalt compounds, ammonium perrhenate, rhenium halide(s), rhenium carbonyl(s), industrial metal salt solutions, organic solvents, etc.

Incipient wetness implies that the metal containing solution is mixed with the dry support until the pores are filled. The definition of the end point of this method may vary somewhat from laboratory to laboratory so that an impregnated catalyst could have a completely dry appearance or a sticky snow-like appearance. However, in no instances is there are any free flowing liquid present.

Furthermore, the impregnation technique may encompass all available methods besides incipient wetness, such as precipitation, impregnation from slurry with surplus liquid, chemical vapour deposition etc. It is well known that the impregnation method may influence the dispersion of the active metal (cobalt) and hence the catalytic activity, but as the Fischer-Tropsch reaction is believed to be non-structure sensitive, dispersion should not significantly influence the selectivity. The impregnated catalyst is dried, typically at 80-120° C., to remove water from the catalyst pores, and then calcined at typically 200-450° C., e.g. at 300° C. for 2-16 h.

A quantitative analysis of the comparison between cobalt and nickel as the primary metal in the Fischer-Tropsch reaction has been performed by H. Shultz, *Topics in Catalysis*, Volume 26, 2003, pages 73-85. Evidently, nickel has a higher hydrogenation activity than cobalt.

Nickel as a promoter to cobalt has not been described previously to our knowledge, but in EP-B-1 058 580, the possibility of using nickel as a modifying component for the support has been disclosed for the supports alumina, titania or magnesia. It is stated that the modifying component is able to suppress the solubility of the catalyst support in aqueous acid or neutral solutions when calcined up to 800° C. to form a spinel compound. For nickel as modifying agent this implies that the spinel $NiAl_2O_4$ is formed, thus giving a more inert surface of the support. However, no example of the effect of nickel as modifying agent has been given.

Further, in EP-B-0296726, formed alumina particles have been impregnated with a solution of nickel nitrate and then calcined at a temperature of about 1200° C. in order to form a nickel aluminate spinel phase that strengthens the particles. It is pointed out that the heat treatment is performed under oxidative conditions to prevent reduction to the metallic nickel state, and therefore Ni is not used as a promoter. Further, the material produced is not used as a support for a Fischer-Tropsch catalyst and no mention is given of cobalt as an active phase.

The main features of an FT-catalyst are its activity, selectivity and stability. The cost of the catalyst both in terms of production costs and raw material expenses also must be considered. The desired selectivity depends on the products of interest for a given project, but in the present context the focus will be on the C5+ selectivity that often is used as an indicator of the wax formation and subsequent potential for maximum diesel production by hydro-isomerization/cracking of the wax.

These properties are somewhat interconnected, e.g. a high activity can give the possibility to reduce the operating temperature, thereby increasing C5+ selectivity. A high stability over time means that the initial activity can be relaxed, e.g. by reducing the cobalt loading or the cobalt dispersion.

SUMMARY OF THE INVENTION

According to the invention, there is provided a supported Fischer-Tropsch catalyst comprising a catalyst material; a promoter and a support material; the catalyst material comprising cobalt present as at least 4% by weight of the catalyst, at least a portion of the cobalt being catalytically active to the F-T reaction; the promoter comprising nickel, the nickel being present in an amount less than the amount of cobalt; and the support material comprising an oxide of a metal selected from either aluminum or titanium or zirconium.

Preferably, the support material effectively consists of an oxide of a metal selected from either aluminum or titanium or zirconium.

The support material is intended to comprise an oxide either of aluminum or titanium or zirconium—not in general two or three in combination. However, titania may incorporate a minor amount of alumina as a binder.

Moreover the metal oxide of the support material would include:
- the metal oxide per se, that is the metal oxide and any small amount of other components incidentally incorporated into the metal oxide material as impurities or remnants of chemicals from the manufacturing of the metal oxide material per se material;
- the metal oxide material that during preparation of the catalyst has been modified to include oxides of nickel, cobalt or any of the promoter metals In the case of alumina as support material the term 'alumina' is meant to include also a mixed oxide of aluminum and silicon, generally known as 'silica-alumina', in which the silica constitutes a minor proportion of the material.

The support material may also comprise lesser amounts of non-catalytically active constituents, such as additives used for improving or maintaining the mechanical strength of the catalyst particles. Alumina may for instance be used as a binder in titania supports. The amount of such non-catalytically active constituents is preferably less than 30 wt %, more preferably less than 20 wt %.

Preferably, the support material consists essentially of an oxide of a metal selected from either aluminum or titanium or zirconium.

Some of the cobalt that is used in preparation of the catalyst may become part of the support as an oxide, optionally as a mixed oxide in combination with other metal oxides. Cobalt that is retained in the support is assumed to have little or no Fischer-Tropsch catalytic capability. Therefore, at least some of the cobalt has to be present in the catalyst composition in amounts and in a (physical and chemical) state that makes the catalyst composition useful as a catalyst for Fischer-Tropsch conversion of synthesis gas to higher hydrocarbons.

The support material may be alumina or titania, preferably alpha- or gamma-alumina, most preferably alpha-alumina. Optionally, the support material additionally contains an oxide of a second metal selected from one or more of silicon, magnesium, cobalt and nickel. The support may comprise a spinel compound formed with alumina. The spinel compound may be nickel aluminate.

The catalyst may also include other metal elements as optional promoters or modifiers. Rhenium may be selected as an optional promoter. The nickel is preferably present in the form of nickel oxide on the surface of the support. The amount of nickel may be less than 50 wt-%, preferably less than 30 wt-%, more preferably less than 15 wt-% relative to the amount of cobalt.

Cobalt or nickel may be incorporated into the metal oxide support as such or as mixed oxides with other support metal oxides, e.g. as spinels with alumina. Oxides of metals like silicon, aluminum and magnesium may act as binders of modifiers of the main metal oxides supports.

The invention also extends to a process for the preparation of catalyst composition as described, in which the support is impregnated with cobalt and nickel compounds and the impregnated composition is dried, calcined and activated.

Preferably, the impregnated composition is calcined at temperatures of less than 600° C., preferably in the range of 200-400° C. Preferably, the impregnated composition is calcined to the extent that less than 50 wt-%, preferably less than 20 wt-%, of the nickel added during impregnation is converted to nickel spinel in the final catalyst composition. Preferably, $Ni(NO_3)_2$ is selected as the nickel compound during impregnation of the metal oxide support. Preferably, the impregnated and calcined composition is activated by reduction, preferably in an atmosphere containing fair amounts of hydrogen.

The invention also extends to a process for Fischer-Tropsch synthesis of hydrocarbons in which synthesis gas is contacted with a catalyst according to the invention. Preferably, the reaction is a three-phase reaction in which the reactants are gaseous, the product is at least partially liquid and the catalyst is solid. Preferably, the reaction is carried out in a slurry bubble column reactor. Typically, $H_2$ and CO are supplied to a slurry in the reactor, the slurry comprising the catalyst in suspension in a liquid including the reaction products of the $H_2$ and CO, the catalyst being maintained in suspension in the slurry at least partly by the motion of the gas supplied to the slurry.

Preferably, the reaction temperature is in the range 190-250° C., e.g. 200-230° C. Preferably, the reaction pressure is in the range 10-60 bar, e.g. 15 to 30 bar. Preferably, the $H_2$/C ratio of the gases supplied to the Fischer-Tropsch synthesis reactor is in the range 1.1 to 2.2, e.g. 1.5 to 1.95. Preferably, the superficial gas velocity in the reactor is in the range 5 to 60 cm/s, e.g. 20 to 40 cm/s.

The product of the Fischer-Tropsch synthesis reaction is subsequently subjected to post-processing, which may be selected from de-waxing, hydro-isomerisation, hydro-cracking and combinations of these.

The invention extends to the products of all the processes and methods described.

By adding nickel as a promoter to a cobalt on alumina catalyst, it has been found, surprisingly, that the activity, stability and/or selectivity increases depending on the composition and type of oxide support employed. Nickel can be impregnated as an aqueous solution of $Ni(NO_3)_2$ or any other solution that contains nickel, e.g. as a divalent ion or complex. Nickel can be contained in the same impregnation solution as cobalt and other optional promoters, or be impregnated in a separate step. After impregnation the catalyst is dried and calcined at a relative moderate temperature up to 600° C., typically 200-400° C., but in no case so that any appreciable amount of nickel spinel is formed. The idea intention is that nickel at least partly will be reduced in the subsequent reduction step to play an active role as promoter to the Fischer-Tropsch reaction on cobalt. The amount of nickel needed to obtain a promoter effect, and to optimize this effect, will vary from catalyst system to catalyst system, depending on factors like cobalt amount, type of support, type of other promoter(s) or modifier(s), and method of catalyst preparation.

The invention also extends to a method for the production of hydrocarbons that comprises subjecting $H_2$ and CO gases to a Fischer-Tropsch synthesis reaction in the presence of a catalyst as described above. The F-T synthesis product may subsequently be subjected to post processing, which may comprise de-waxing, hydro-isomerization, hydro-cracking, washing, finishing, fractionating, blending, cracking, reforming and combinations of these.

The described FT catalyst is suited for use in a three-phase reactor, particularly a slurry bubble column. However, an additional option is to form the catalyst into any suitable shape such as spheres, pellets or extrudates, with or without intrusions. Further, additives or binder materials may be added as needed as part of the forming process. Such formed materials will typically have a size in the range 1 to 20 mm and be used in a fixed-bed reactor or dense three-phase reactor like an ebullating bed.

The FT reaction is operated with a syngas comprising hydrogen and CO, in addition to inert or essentially inert components such as $CO_2$, methane and/or nitrogen. Significant amounts of steam and light hydrocarbons will also be present, at least due to their synthesis in the process itself, in addition to some olefinic and oxygenated by-products. The temperature used with a cobalt-type catalyst intended for primary production of paraffinic wax is in the range between 190 and 250° C., more typically between 200 and 230° C. The total pressure can be in the range 10 to 50 bar, typically between 15 and 30 bar. The hydrogen to CO consumption ratio in the process is close to 2. Therefore the $H_2/CO$ feed ratio will not vary much from this value. However, it might be advantageous to feed with a lower $H_2/CO$ ratio, e.g. between 1.5 and 1.95, thereby giving a higher selectivity to C5+ products.

A slurry bubble column will contain several features within the reactor shell or attached as an external device. These features may comprise a gas distributor, heat exchanger tubes, a system for separating the liquid product from the slurry and possible downcomers for forced circulation to enhance the backmixing and level out gradients in the reactor. The superficial gas velocity based on the full diameter of the reactor is typically in the range 10 to 60 cm/s more typically 20-40 cm/s, thus operating in the churn turbulent flow regime.

The products will be condensed, if needed, and separated through a system of separation vessels and columns, and blended to desired products. A large portion of the product consisting of long chain hydrocarbons can be treated under hydrogen and elevated temperature and pressure with one or several catalysts to remove oxygenates and saturate olefins, crack the chain to the desired length and isomerise essentially straight paraffins to branched paraffins. Such a treatment typically gives a synthetic diesel or diesel blending component that contains no aromatics or sulphur compounds, in addition to having a very high cetane index (above 50 or even above 70) and a desired cloud point. Other products that might be produced ultimately include naphtha, particularly petrochemical naphtha, base oil for lubricant production and components for synthesis of detergents such as linear higher alpha-olefins, in addition to the by-products LPG, alpha-olefins and oxygenates.

Depending on the actual Fischer-Tropsch process design, the various improved properties can be utilized in different ways. A high C5+ selectivity means that a higher portion of desired synthetic crude or diesel fuel can be produced at the expense of fuel gas, and that recycle streams in the plant can be reduced. This results in both reduced investment and feedstock costs for a given production of e.g. diesel. High catalyst stability and activity can result in design of smaller more efficient reactors, but also in lower operating costs in terms of catalyst expenditure. It is to be expected that the positive effect of nickel promoted FT-catalysts will be present in any type of reactor, like fixed-bed reactors, slurry-bubble column reactors, ebullating-bed reactors, fluidized-bed reactors, monolith reactors etc.

DETAILED DESCRIPTION

Figure 1A:
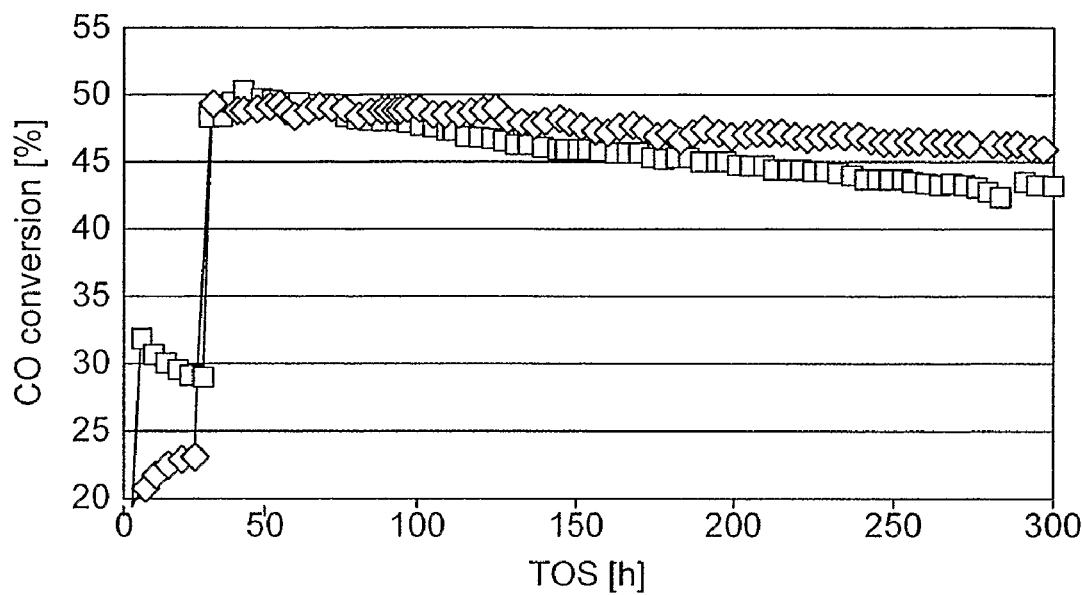
FIG. 1a is a catalyst comparison graph according to an embodiment.
Figure 1B:
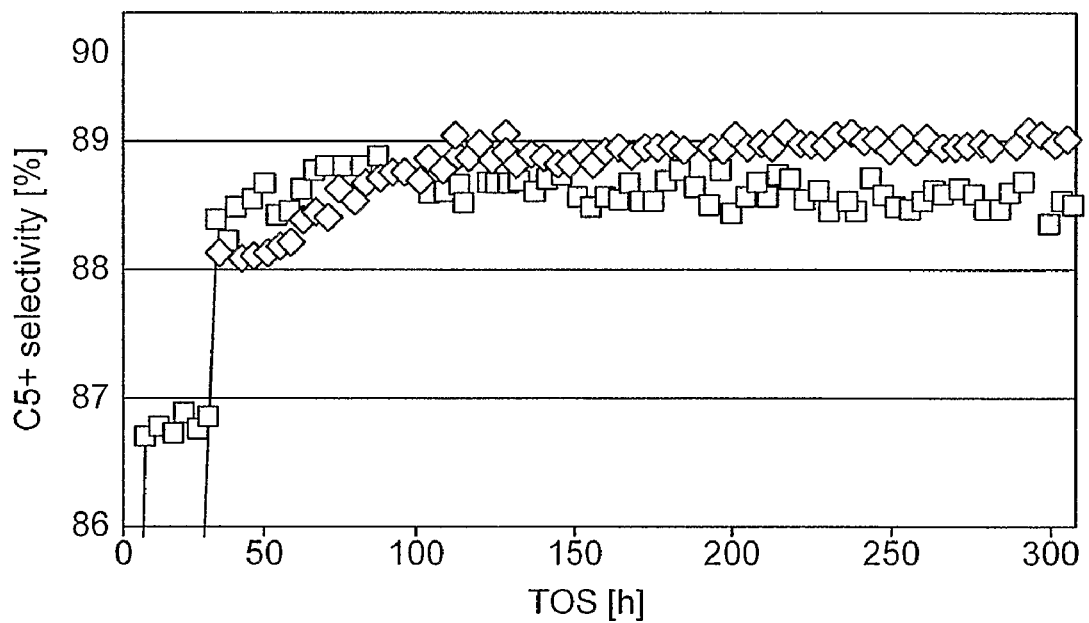
FIG. 1b is a catalyst comparison graph according to an embodiment.

The invention will now be illustrated in the following non-limiting Examples.

Some fixed-bed testing of activated catalysts has been performed in a laboratory unit with four parallel fixed-bed reactors. About 1 g of catalyst particles in a controlled size fraction was mixed with 5 times the volume of inert SiC. Reduction was performed in situ with hydrogen as reducing gas at 350° C. The reduction step lasted 16 hours. Under such conditions, a sufficient proportion of the available cobalt was transformed into a catalytically active state. Then, an approximate 2:1 mixture of hydrogen and CO was carefully added. After 20 h on stream at 210° C. and 20 bar total pressure, the space velocity was adjusted to give an estimated conversion level of CO after 90 h of between 45 and 50%. It is of utmost importance to perform selectivity comparisons, as well as activity comparisons, at the same conversion level, since the level of steam generated in the reaction has a profound influence on catalyst performance.

TABLE 1

Fixed-bed testing of selected catalysts.*

| Nominal metal Composition | Catalyst identification | Relative catalyst activity (100 h TOS) | Relative catalyst C5+ selectivity (100 h TOS) | Stability 25 –> 100 h TOS |
|---|---|---|---|---|
| Catalysts on γ-alumina Sasol SCCa: SA = 170 m2/g | | | | |
| 20Co/0.5Re | 10-14A | 1.54 | 0.933 | Medium |
| 20Co/0.5Re/2Ni | 17-28A | 1.76 | 0.920 | Medium |
|  |  | 1.61 | 0.930 |  |
| 20Co/0.5Re/5Ni | 18-5A | 1.73 | 0.941 | High |
| 20Co/0.5Re/5Ni** | 18-18B | 1.60 | 0.926 | High |
| 20Co/0Re | 19-17A | 1.06 | 0.901 | Medium |
| 20Co/0.5Re | 10-14A | 1.54 | 0.933 | Medium |
|  | 11-25A |  |  |  |
| 20Co/0Re/5Ni | 19-18A | 1.46 | 0.919 | High |
| 20Co/0.25Re/2Ni | 19-19A | 1.48 | 0.919 | Medium |
| 20Co/0.5Re/2Ni | 17-28A | 1.76 | 0.920 | Medium |
| 20Co/0.5Re/5Ni | 19-11A | 1.78 | 0.928 | Medium/High |
| 10Co/0.5Re/10Ni | 18-29A | 0.81 | 0.881 |  |
| Catalysts on α-alumina/Ni-spinel: SCCa/5 wt % Ni calcined 1140° C.: SA = 12 m2/g | | | | |
| 12Co/0.5Re | 15-26A | 0.94 | 0.975 | Medium/high |
| 12Co/0.5Re/2Ni | 17-10A | 0.90 | 0.971 | Very high |
| " | 17-10A | 0.86 | 0.980 | Very high |
| 12Co/2Ni | 17-22A | 0.80 | 0.969 | Very high |
| 2Ni | 17-17A | 0 | — | — |
| Titania; Degussa P25 | | | | |
| 12Co/0.5Re | 5-15A | 0.47 | 0.995 | Very high Incr. Act. |
| 12Co/0.5Re/2Ni*** | 17-19A | 0.47 | 0.975 | Very high Incr. Act. |
| 12Co/0.5Re/2Ni**** | 18-24A | 0.81 | 0.994 | Very high Incr. Act. |
| Silica | | | | |
| 20Co/0.5Re | TRN-21-6A | 0.94 | 0.918 | Very high Incr. Act |

TABLE 1-continued

Fixed-bed testing of selected catalysts.*

| Nominal metal Composition | Catalyst identification | Relative catalyst activity (100 h TOS) | Relative catalyst C5+ selectivity (100 h TOS) | Stability 25 -> 100 h TOS |
|---|---|---|---|---|
| 20Co/0.5Re/5Ni | TRN-21-18A | 1.21 | 0.919 | Very high Incr. Act |

*TOS = Time on stream. Relative activity = 1 corresponds to a rate of ca. 1.1 $g_{hydrocarbons}/g_{cat}$ * h. Relative $C_{5+}$ selectivity = 1 corresponds to 78% in fixed after 90 h TOS.
**Two-step impregnation. Ni solution added first to the alumina, then dried.
***Two-step impregnation. Co/Re solution added first to the alumina, then dried and calcined.
****Titania support precalcined to 700° C.

All the catalysts used contain a nominal amount of cobalt of 12 or 20 wt % and no or 0.5 wt % Re, calculated assuming reduced catalysts with complete reduction of cobalt and rhenium. The actual metal loading as determined by XRF or ICP may vary up to ±10%, i.e. for cobalt between 18 and 22 wt % of the total reduced catalyst weight for a 20 wt % Co nominal composition.

The data in Table 1 shows that adding Ni to a Co or a Co/Re catalyst increases the activity significantly. Surprisingly, it is also seen that Ni can substitute Re as promoter. Even more surprisingly, it is observed that adding Ni to the Co catalyst, either as a second promoter or instead of Re, does not decrease $C_5+$ selectivity, as would be expected, since Ni is known to have hydrogenation abilities.

Ni also has a stabilizing effect on the catalyst activity.

Typical tests results for two classes of supports are summarized in Table 2. Note that the alpha-alumina catalyst support can be produced from gamma-alumina by high temperature treatment in the temperature range 1000-1300° C.

A modified alpha-alumina support containing a spinel compound can be prepared by impregnating gamma-alumina, or another high surface area alumina or alumina precursor, with a divalent metal ion solution followed by high temperature calcination. The divalent metal can be a transition metal or an alkali earth metal, preferably nickel, and the subsequent calcination can be performed in the temperature range 1100-1250° C., e.g. at 1160° C.

The advantageous effect of the nickel promoter on the catalyst stability is seen for all the three different support materials employed. The optimum level of nickel will vary from catalyst system to catalyst system, but a range of 2-5 wt % seems adequate in most cases. This may translate to 10-50 wt % nickel relative to cobalt, or preferably 10-30 wt %.

The results also show that a catalyst containing cobalt and nickel in equal amounts gives lower C5+ selectivity. This is not surprising since nickel is known to promote production of light weight hydrocarbons, methane in particular. Thus, when the amount of nickel exceeds the amount of cobalt, its beneficial promoting effect decreases and its action as a methane producing catalyst becomes more pronounced.

Experiments with a commercial catalyst demonstrated a good effect on catalyst stability with only 10 wt % Ni relative to Co. Additional tests with 50/50 mol % Ni/Co ratio showed an adverse effect in terms of a reduced selectivity to C5+ hydrocarbons. This is to be expected as the Fischer-Tropsch activity of nickel now influences the catalytic performance at these high concentrations.

TABLE 2

| | | Relative effect of nickel promotion | | |
|---|---|---|---|---|
| Type of support | Metals/promoters (wt %) | Activity | C5+ Selectivity | Stability |
| gamma-alumina | 15-40 wt % Co<br>0-1 wt % Re<br>2-8 wt % Ni | Increase | Unchanged | Significant increase for >2 wt % Ni |
| alpha-alumina + optional spinel | 8-15 wt % Co<br>0-0.5 wt % Re<br>1-3 wt % Ni | Unchanged | Increase with TOS | Significant increase |
| Titania (indicative data) | 12 wt % Co<br>0.5 wt % Re<br>2 wt % Ni | Unchanged | Unchanged | Increase |

Figure 2:
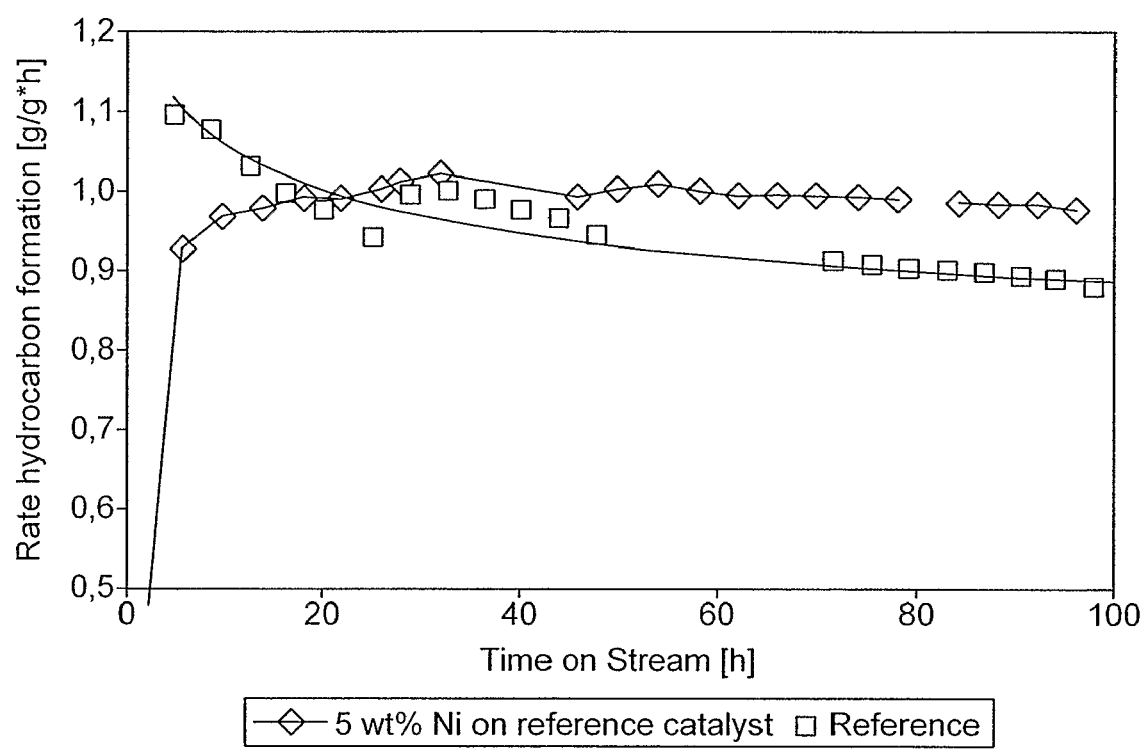
FIG. 2 is a catalyst comparison graph according to an embodiment.

FIG. 2 gives a further example comparing a 5 wt % Ni promoted catalyst 18-5A with the reference catalyst 10-14A. Again it is demonstrated that adding nickel to the cobalt/rhenium impregnating solution clearly gives a more stable catalyst. Some variations in the curves at 20-30 hours TOS are observed, due to GHSV adjustments to harmonize the conversion levels.

An example of increased performance is illustrated in FIGS. 1a (upper) and 1b (lower) by comparing catalysts 15-26A (squares) and 17-10A (open diamonds). It is evident that the latter catalyst containing nickel promoter is significantly more stable, by a factor of approximately 3. Another striking effect is found by comparing the C5+% selectivity of the two catalysts as nickel promotion gives an anomalous increase in selectivity the first 100 hours and then levels off to a stable performance. Normally, some reduction in the selectivity with time is experienced.

The invention claimed is:

1. A supported Fischer-Tropsch catalyst comprising a catalyst material, the catalyst material comprising cobalt present as at least 4% by weight of the catalyst, at least a portion of the cobalt being catalytically active in a Fischer-Tropsch reaction; a promoter comprising nickel, wherein the nickel is present in an amount less than the amount of cobalt; and a support material comprising a first oxide of a metal selected from the group consisting of aluminum, titanium, silicon, magnesium and zirconium.

2. The catalyst of claim 1, wherein the support material consists essentially of an oxide of a metal selected from the group consisting of aluminum, titanium, and zirconium.

3. The catalyst of claim 1, wherein the support material consists of an oxide of a metal selected from the group consisting of aluminum, titanium, and zirconium.

4. The catalyst of claim 1, wherein the support material is alpha- or gamma-alumina.

5. The catalyst of claim 1, wherein the support material further comprises a minor amount relative to the amount of the first oxide, of a second oxide of a second metal, the second metal selected from the group consisting of silicon, aluminum, magnesium, cobalt and nickel.

6. The catalyst of claim 5, wherein the promoter further comprises rhenium or manganese.

7. The catalyst of claim 5, wherein nickel is present in the form of nickel oxide on the surface of the support.

8. The catalyst of claim 5, wherein the support material comprises a spinel compound formed with alumina.

9. The catalyst of claim 8, wherein the spinel compound comprises nickel aluminate.

10. The catalyst of claim 1, in which the amount of nickel is less than 50 wt % compared to the amount of cobalt.

11. The catalyst of claim 1, wherein the amount of nickel is less than 30 wt-%, relative to the amount of cobalt.

12. The catalyst of claim 1, wherein the amount of nickel is less than 15 wt % relative to the amount of cobalt.

* * * * *